United States Patent Office 3,520,084
Patented July 14, 1970

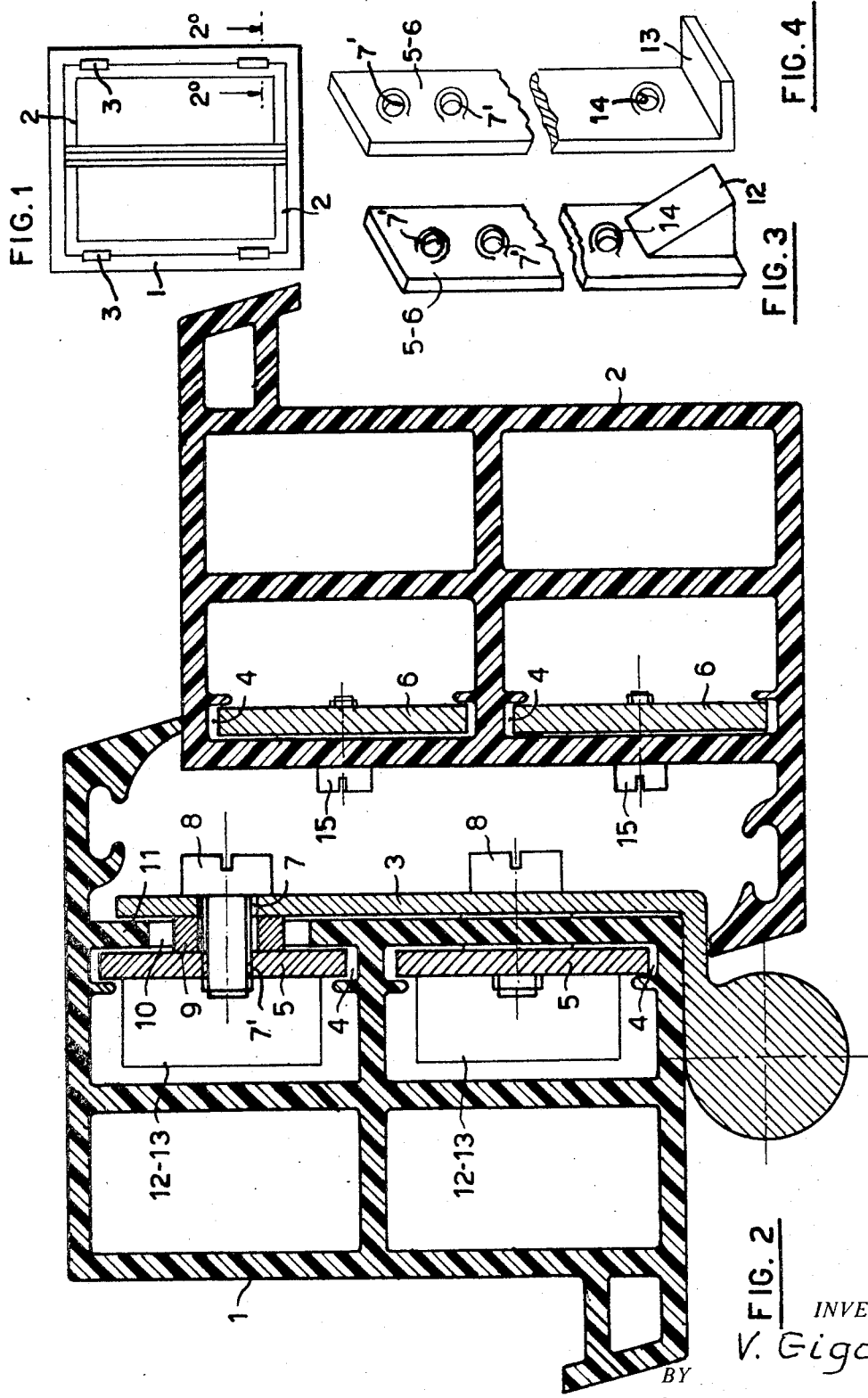

3,520,084
FRAME ASSEMBLY
Vincenzo Gigante, Via A. Volta 13,
Monza, Milan, Italy
Filed Dec. 5, 1968, Ser. No. 781,401
Claims priority, application Italy, Dec. 12, 1967,
817,422
Int. Cl. E05d *15/02*
U.S. Cl. 49—381                                7 Claims

ABSTRACT OF THE DISCLOSURE

Rigid metal bars are provided in hollow portions of a fixed frame and a hinged frame constituting a plastic frame assembly for doors or windows. Screws are used for fastening the hinges to the bars and slightly thicker spaces are interposed to avoid compression of plastic sections by the screws.

---

This invention relates to a frame assembly of plastics for supporting a window, door or the like.

Frame assemblies made entirely of plastics material, such as rigid polyvinyl chloride and other materials, have been known for a number of years, but none of these retains their stability for a long time, since after a fairly short working life a movable part of the frame assembly sags under the action of its own weight, so that perfect fitting to a fixed part of the frame assembly when the assembly is closed is no longer ensured. This displacement of the movable part in relation to the fixed part, which occurs both in single-leaf and in multi-leaf frame assemblies, is due essentially to the nature of the plastics material, which tends to contract when subjected to compression, as occurs in the specific case of frame assemblies where the hinges are fixed in the usual manner directly on the plastics material by clamping bolts or screws.

It is an object of the invention to obviate this disadvantage. To this end the invention provides a frame assembly of plastics material for doors, windows, or the like, in which the means fastening the hinges, such as screws and bolts, are not fastened direct to the plastics material in the usual manner, but are fastened to one or more metal bars disposed longitudinally inside the fixed and movable frames.

According to the present invention there is provided a frame assembly of plastics material for doors, windows, or the like, wherein the assembly includes a fixed frame and at least one movable frame connected to the fixed frame by hinges, both frames being of hollow section, and wherein the interior of the movable frame or frames and the fixed frame there is provided at least one rigid metal bar supporting the corresponding frame and so disposed as to bear respectively at the top closed portion of the movable frame or frames and at the bottom, likewise closed portion of the fixed frame, there being screw means for fastening the hinges to the bar(s) through the interposition of a spacer of slightly greater thickness than that of the plastics section, thereby to avoid compression of the plastics section by said screw means. This spacer is preferably disposed with ample clearance inside a perforation or cavity formed in the plastics section, in such a manner that under the effect of heat the plastics section is free to expand in relation to the metal bar which has a much lower coefficient of thermal expansion than that of plastics material.

For the purpose of increasing the area over which the fixed and movable frames are supported against their respective bars, each of the latter is provided at the top or bottom respectively with a lateral projection or widened portion directed towards the interior of the frame, the projection or widened portion being constituted by an attached block or else by simply folding-over at right angles the corresponding end of the bar.

For frame assemblies subject to a certain amount of use, for which it is necessary to employ a plurality of fixing means, there will be more than one supporting bar, and all such bars will be disposed parallel to one another and their number will be proportional to the size and weight of the frame assembly.

In order to enable the invention to be more readily understood, reference will now be made to the accompanying drawings, which illustrate diagrammatically and by way of example a frame assembly comprising two leaves and having two hinges for each leaf and two supporting metal bars both for the fixed frame and for the movable frame, and in which:

FIG. 1 is a front view of the frame assembly in a closed position;

FIG. 2 is a section on the line $2^0$—$2^0$ of the frame assembly illustrated in FIG. 1, shown on a larger scale, and FIGS. 3 and 4 are perspective views illustrating constructional details of two supporting bars.

Referring now to the drawings, there is shown a frame assembly having a fixed frame 1 and movable frames 2, all made of plastics material and of any section, and connected together by metal hinges 3.

Both the frame 1 and the movable frames 2 are formed in the interior with one or more longitudinal channels 4 in which metal bars 5 and 6 supporting the frames can be seated after insertion thereinto.

The bars 5 of the fixed frame 1 are supported against the closed bottom of said frame, while the top ends of the bars 6 are placed in direct contact with the likewise closed top portion of the movable frame 2.

Each hinge 3 is formed with transverse holes 7, of which in the example illustrated there are three, in a triangular arrangement, and which correspond axially to an equal number of holes 7' formed in the bars 5 and 6 so as to be able to receive screws 8 which fasten the hinges against said bars by simply being screwed into the same.

Between each hinge 3 and each of the metal bars 5 and 6 there is disposed, so as to coincide axially with each screw 8, a washer 9 which is received in a hole 10 formed correspondingly in the frames 1 and 2. This hole 10 is of greater diameter than that of the spacer washer 9, so that the sections 1 and 2 of plastics material can expand freely under the action of heat without striking against the metal bars 5 and 6, which have a lower coefficient of thermal expansion than that of the plastics material.

The washers 9 have a slightly greater thickness than that of the plastics section 11 of the relative frames, so as to prevent direct contact of said section with either the hinge or with said bars when the screws 8 are completely tightened. In this manner the plastics material of the frame assembly is not compressed by the fastening means.

The metal bars 5 supporting the fixed frame 1 end at the bottom in a projection bearing against the closed bottom of the frame, while the metal bars 6 supporting the movable frames 2 end at the top in a similar projection bearing against the closed top part of said movable frames 2, so as to increase the stability of said parts even after the frame assembly has been in use for a long time.

In a preferred embodiment this projection is constituted by a block 12 fastened to the corresponding bar as shown in FIG. 3. According to an alternative construction, however, this projection supporting the bars against the plastics frames is obtained by folding-over at right angles the working end 13 of said bar as shown in FIG. 4.

In FIGS. 3 and 4, the reference 14 indicates a hole for the passage of a screw 15 for securing the bars to the respective frames.

It is obvious that in addition to performing the above-mentioned duties as supports, the metal bars 5 also have the task of reinforcing, through their rigidity, the strength of the plastics section used for the construction of the frame assembly.

It will be appreciated that in practice many constructional modifications and adaptations of the present frame assembly for doors, windows, or the like may be made.

What I claim is:

1. A frame assembly of plastics material for doors, windows, or the like, wherein the assembly includes a fixed frame and at least one movable frame connected to the fixed frame by hinges, both frames being of hollow section, and wherein in the interior of the movable frame or frames and the fixed frame, there is provided at least one rigid metal bar supporting the corresponding frame and so disposed as to bear respectively at the top closed portion of the movable frame or frames and at the bottom, likewise closed portion of the fixed frame, there being screw means for fastening the hinges to the bar(s) through the interposition of a spacer of slightly greater thickness than that of the plastics section, thereby to avoid compression of the plastics section by said screw means.

2. A frame assembly as claimed in claim 1, wherein the spacer interposed between the hinges and the metal bar supporting the frames is a washer or plate and is situated with ample clearance inside a hole formed in the plastics section, so as to enable the plastics section to expand freely without being hindered by the metal bar, the coefficient of thermal expansion of which is lower than that of the plastics material.

3. A frame assembly as claimed in claim 1, wherein the metal bar(s) supporting the frames and also serving to reinforce the plastics section is (are) inserted inside channels formed longitudinally in said section.

4. A frame asembly as claimed in claim 1, wherein the or each metal bar supporting the movable frame or frames has at the top a lateral projection or a widened portion supported against the top closed part of the plastics section.

5. A frame assembly as claimed in claim 1, wherein the or each metal bar supporting the fixed frame has at the bottom a lateral projection or a widened portion supported against the bottom closed portion of the plastics section.

6. A frame assembly as claimed in claim 4, wherein the lateral projection or widened portion of the metal bar is constituted by a block attached to the appropriate end of the bar.

7. A frame assembly as claimed in claim 4, wherein the lateral projection or widened portion of the metal bar is constituted by a portion of the bar bent over at right angles to the appropriate end of the bar.

References Cited

UNITED STATES PATENTS

| | | | |
|---|---|---|---|
| 2,927,354 | 3/1960 | Lauer | 49—501 XR |
| 3,354,586 | 11/1967 | Den Besten | 49—504 |
| 3,389,503 | 6/1968 | Goess et al. | 49—396 |

FOREIGN PATENTS 1,279,752  11/1961  France.

KENNETH DOWNEY, Primary Examiner

U.S. Cl. X.R.

49—401, 501, 504